Figure 1:
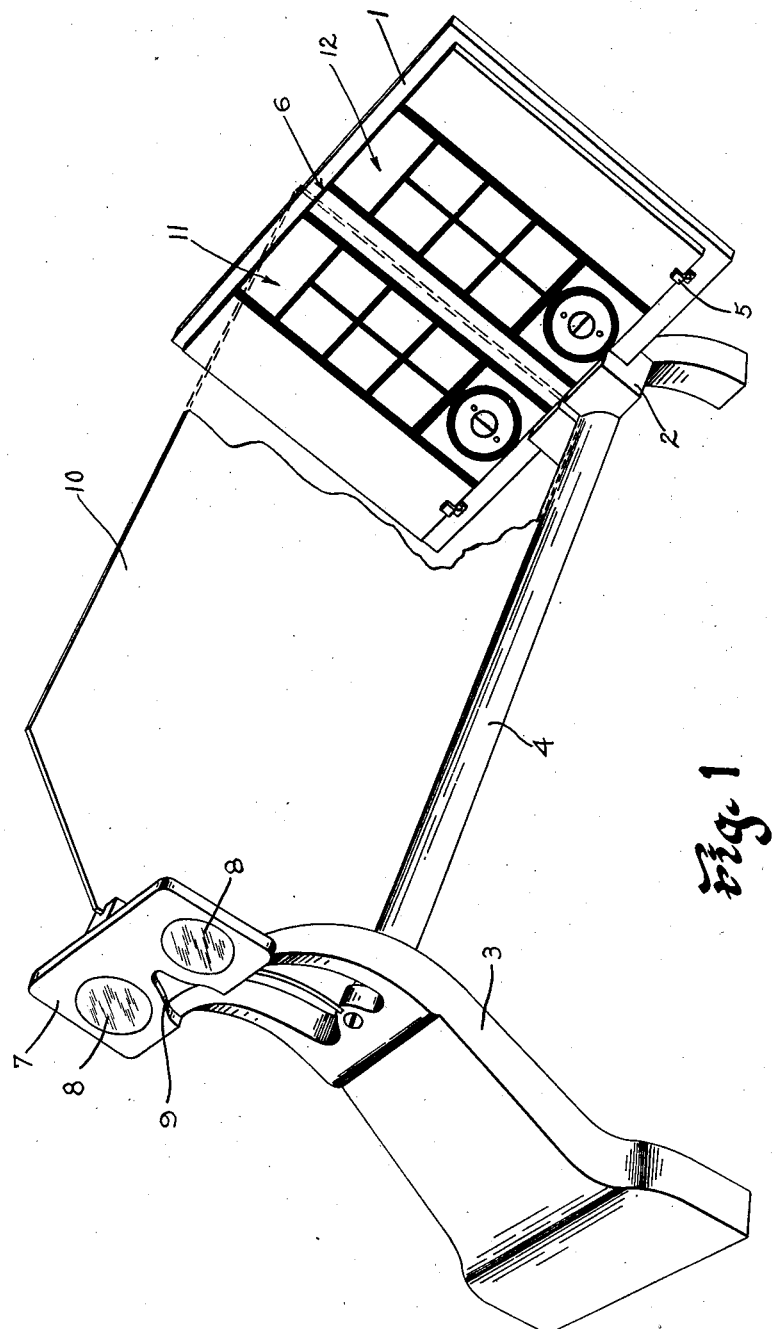
Figure 2:
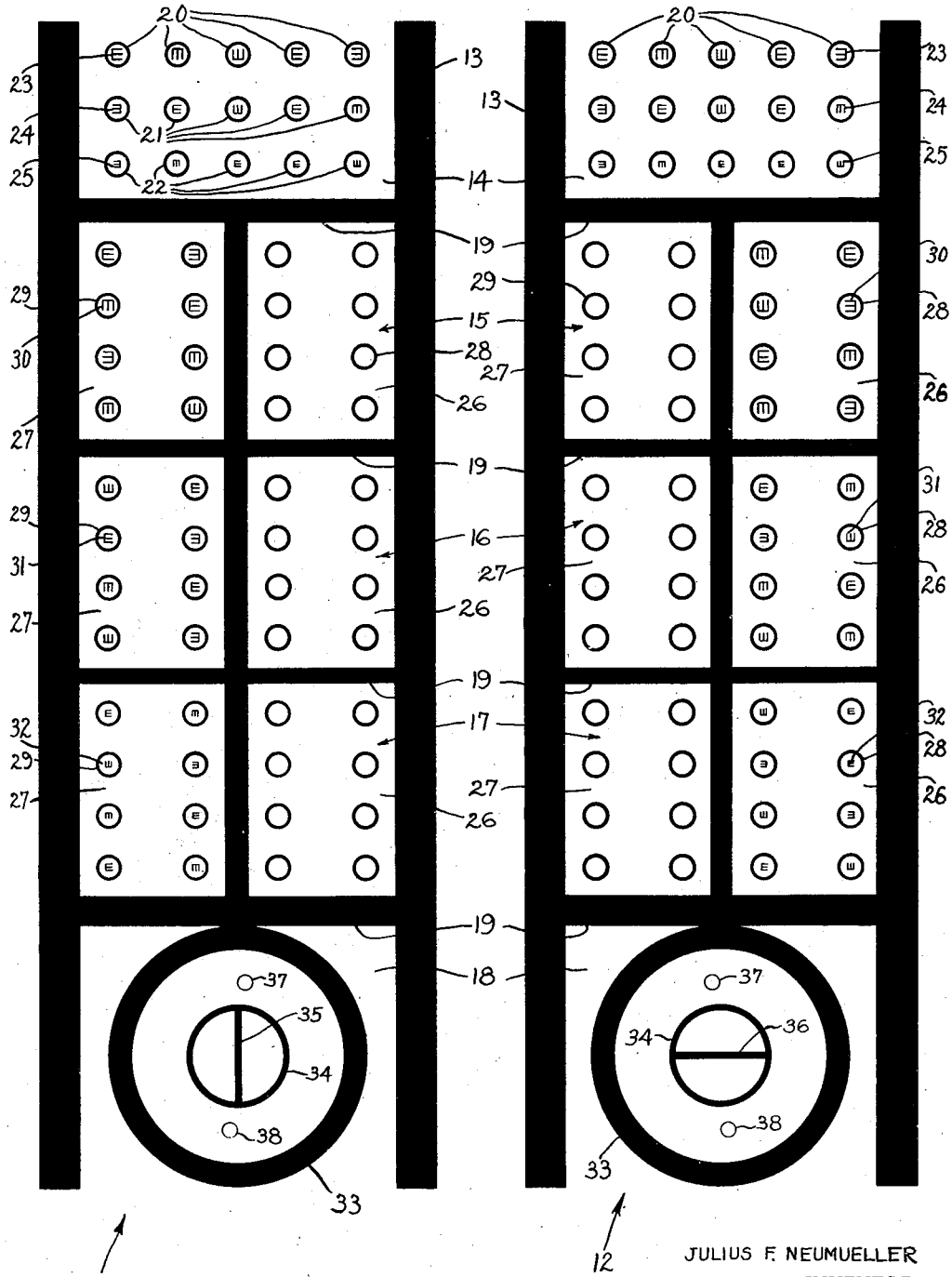

Aug. 17 1943.   J. F. NEUMUELLER   2,326,965
MEANS FOR TESTING EYES
Filed Oct. 13, 1941   2 Sheets-Sheet 1

JULIUS F. NEUMUELLER
INVENTOR

BY
*Louis L. Gagnon*
ATTORNEY

Aug. 17 1943.    J. F. NEUMUELLER    2,326,965
MEANS FOR TESTING EYES
Filed Oct. 13, 1941    2 Sheets-Sheet 2

JULIUS F. NEUMUELLER
INVENTOR

BY Louis L. Gagnon
ATTORNEY

Patented Aug. 17, 1943

2,326,965

UNITED STATES PATENT OFFICE 2,326,965

MEANS FOR TESTING EYES

Julius F. Neumueller, Dudley, Mass., assignor to American Optical Company, Southbridge, Mass., a voluntary association of Massachusetts Application October 13, 1941, Serial No. 414,815

8 Claims. (Cl. 88—20)

This invention relates to improvements in ophthalmic instruments and has particular reference to improved means for detecting the major visual deficiencies.

One of the principal objects of the invention is to provide a unitary device for use in group checking to detect whether or not the visual faculties of the individuals of said group are of certain standards.

Another object of the invention is to provide a unitary device for checking the eyes of an individual for various visual deficiencies under conditions of relaxed accommodation.

Another object is to provide a unitary device embodying means for use in group checking for detecting visual deficiencies as to monocular visual acuity in the presence of binocular fixation means, and single binocular visual acuity and the existence of simultaneous perception and stereopsis.

Another object is to provide improved means for detecting visual deficiencies embodying fixation means having, in addition to the visual stimuli, peripheral and central fusable means associated with said stimuli.

Other objects and advantages of the invention will become apparent from the following description taken in connection with the accompanying drawings and it will be seen that many changes may be made in the details of construction, arrangement of parts and steps of the methods shown and described without departing from the spirit of the invention as expressed in the accompanying claims. I, therefore, do not wish to be limited to the exact details of construction, arrangement of parts and steps of the method shown and described as the preferred form only has been given by way of illustration.

Referring to the drawings:

Fig. I is a perspective view of the device embodying the invention;

Fig. II is an enlarged face view of the test means of the device illustrated in Fig. I.

The invention is primarily directed to the provision of simplified unitary means for detecting the existence of visual deficiencies of an individual and is particularly suited for use in determining these deficiencies in a minimum amount of time whereby the device is especially adapted for use in group checking to determine whether or not the visual faculties of the individuals of said group are of a certain standard. Such a device is particularly adaptable for use in checking the visual deficiencies of students or other similar groups and is intended merely as a check to determine the existence of said deficiencies but not the extent of said deficiencies.

The device is particularly adaptable for checking the major deficiencies of the eyes and the intent is that if such deficiencies are detected in an individual the individual is then instructed to have a thorough examination of his eyes.

Referring more particularly to the drawings the device embodying the invention comprises a chart holder 1 carried by a bracket 2 supported in spaced relation with a bracket 3 by a tie member 4. The chart holder 1 has suitable clips 5 for securing the chart 6 to the holder. The bracket 3 has supported adjacent the upper end thereof a holder 7 for suitable lenses 8. The holder 7 has a recess 9 for clearance of the nose of the individual under test. A suitable septum 10 is carried by the tie member 4 for the purpose of rendering the spaced areas 11 and 12 of the chart separately visible to the respective eyes viewing said chart through the lenses 8.

The distance between the lenses 8 and the chart 6 is substantially equal to the focal length of said lenses. This tends to eliminate accommodation. The areas 11 and 12 are spaced apart an amount substantially equal to the distance between the two lenses 8 with a view to eliminating the necessity of the eyes to converge. This is for the purpose of rendering the visual axes of the two eyes substantially parallel and to aid in the relaxation of accommodation as much as possible. The areas 11 and 12 of the chart 6 are so related with the axes of the respective lenses 8 as to cause said axes to be substantially centrally located with said areas so that the eyes will utilize more of the central areas of the lenses 8 during the scanning of said areas.

The areas 11 and 12, as previously stated above, are separately visible to the respective eyes and each embody a relatively heavy outline framing 13 producing a pronounced peripheral fusable means. Each of the areas 11 and 12 comprise a plurality of blocks 14, 15, 16, 17 and 18 each separated by a framing line 19 also producing peripheral fusable means. In the block 14 of the respective charts there is formed a plurality of circles 20, 21 and 22 respectively containing visual stimuli 23, 24 and 25. The respective circles 20 of the separate areas 11 and 12 constitute central fusable means and the stimuli contained in the respective circles 20 are also so formed as to have fusable characteristics. The said stimuli 23, 24 and 25 are so formed as to be a check for the following visual acuities: 20—40, 20—30 and 20—20; the said stimuli 23 being a 20—40 stimuli, the 24 being the 20—30 stimuli and the 25 being the 20—20 stimuli. The stimuli 23, 24 and 25 in the respective blocks 14 are viewed separately by the respective eyes and are intended for use in checking single binocular visual acuity of the two eyes. This is brought about through the tendency of the two eyes to fuse the peripheral fusable means 13 and 19 and the central fusable means 20, 21 and 22 as the case may be as well as the specific stimuli being viewed.

If the individual is able to accurately state the direction in which the branches of the E of the stimulus 25 are disposed his visual acuity is roughly estimated as 20—20 of the normal standard. If he is unable to accurately state these directions and can only accurately state the direction or disposition of the branches of the E of the stimulus 24 his vision is estimated as approximately 20—30 and likewise 20—40 for the stimulus 23. In order to be in a normal class in this respect his visual acuity must be 20—20. The blocks 15, 16 and 17 are divided into two sections 26 and 27. The respective blocks 26 have a plurality of circles 28 therein which constitute central fusable means. The respective sections 27 have circles 29 of similar dimensions adapted to be respectively fused by the two eyes. Within the circles 29 of the respective sections 27 and within the respective circles 28 within the sections 26 there is placed the visual stimuli 30, 31 and 32. The stimuli 30 are of the 20—40 type; the stimuli 31 of the 20—30 type and the stimuli 32 of the 20—20 type.

The stimuli within the circles 29 are visible only to the left eye and the stimuli in the circle 28 are visible only to the right eye. During the check, the respective circles 29, and the blocks 15, 16 and 17 are adapted to fuse with each other and the circles 28 within the respective blocks 15, 16 and 17 are likewise adapted to fuse with each other. The individual is then asked if he sees visual stimuli in all of said circles. If he sees only visual stimuli in the left hand side of the blocks 15, 16 and 17 the examiner immediately knows that the visual acuity of his right eye is deficient and if he reports only vision of the stimuli in the right side of the blocks 15, 16 and 17 the examiner immediately knows that the visual acuity of his left eye is deficient. This provides a monocular test of the respective eyes and the visual acuity is determined by the accuracy of his reports as to the direction in which the branches of the E of the respective stimuli are disposed in each of said blocks. If he is capable of only accurately stating the direction of disposition of the branches of the E in the block 15 he has 20—40 vision; if he can accurately state the disposition of the branches of the E in the block 16 he has 20—30 vision and if he can accurately state the disposition of the branches E in the block 17 he has 20—20 vision. In this manner the visual acuity of the respective eyes may be determined. It might be that he can detect all of the E's in both of the right and left hand blocks 15 in which instance he has 20—40 vision for the both eyes. If he can only detect the right or left stimuli in the block 15 the examiner knows that he has 20—30 vision in the right or left eye as the case may be and likewise with the stimuli in the block 17. This provides a very simple and quick means of detecting the visual acuity of each eye separately. In the block 18 there is shown two large relatively heavy circles 33 which constitute peripheral fusable means. Within these circles 33 there are smaller circles 34 which constitute central fusable means. In the circle 34 for the left eye there is a vertical line 35 and in the circle 34 for the right eye there is a horizontal line 36. If the individual has single binocular vision he will report vision of the circle 34 with the axis lines 35 and 36 crossing each other to produce a cross image. If the visual acuity of one of the eyes is deficient or if he suppresses vision in one eye he will report seeing only a horizontal or vertical line. Within the circles 33 there is positioned above and below the circle 34 small circular image-producing means 37 and 38 which, if the patient has stereopsis, will fuse with each other with the images 37 appearing as being in a plane closer to the individual than the images 38. It is to be noted that the images 37 are closer to each other than the images 38 which produce the effect desired.

Reviewing the above, therefore, if the individual has single binocular vision he will see the circular images 34 in fused relation with each other with the lines 35 and 36 producing the cross image indicating that the patient sees with both eyes at the same time. If the individual has stereopsis the images 37 and 38 will appear fused with each other with the images 37 appearing in a plane closer to the individual than the images 38. In this manner the examiner may quickly determine the existence of single binocular vision and the existence of stereopsis.

The above respective chart areas 11 and 12 therefore provide means for a quick check of binocular visual acuity through the use of the test means within the respective blocks 14, the check of monocular visual acuity in the presence of binocular fixation means by the use of the test means within the blocks 15, 16 and 17 and the test of single binocular vision by the use of the test means within the respective blocks 18. The test for stereopsis is obtained through the provision of the respective fusable means 37 and 38. These constitute a check of the major visual faculties of the eyes and in this manner each individual may be quickly and easily checked for any one of said definciencies in which instance the individuals having a visual deficiency may be isolated from those who have normal vision. The isolated individuals of course can be checked for the particular deficiency and the extent of the same is to be determined by a subsequent detailed re-examination.

The arrangement of spacing of the lenses, powers of the lenses, distance of the fixation charts for the respective eyes and distance between component or corresponding parts of said charts and pronounced peripheral fusable means are all so related with each other as to tend to remove all accommodative effort from the eyes during fixation by more accurately or more closely simulating infinity fixation conditions.

From the foregoing description it will be seen that simple, efficient and economical means and methods have been provided for accomplishing all of the objects and advantages of the invention.

Having described my invention, I claim:

1. A test device comprising means adapted to be viewed by each respective eye under conditions which tend to relax accommodation, said means each comprising relatively pronounced peripheral fusable stimuli so spaced relative to each other as to insure that the line of vision of the respective eyes remain substantially parallel during the test and further comprising a plurality of central fusible means arranged in groups of the same size within the peripheral stimuli with at least one group of said central fusible means for the respective eyes having associated therewith test symbols of graded sizes for detecting visual acuity deficiencies.

2. A test device comprising a pair of lenses before the eyes and eye fixation means positioned within the field of vision through said lenses and having portions visible to the respective eyes, said portions each comprising relatively pronounced heavy straight line peripheral fusible means and central fusible means arranged in groups of the same size within the peripheral stimuli with at least one group of said central fusible means for the respective eyes having associated therewith test symbols of graded sizes for detecting visual acuity deficiencies, the respective components of said fusible means being spaced apart an amount substantially equal to the distance between the lenses to tend to relax accommodation during the test.

3. A test device comprising a pair of lenses before the eyes and eye fixation means positioned within the field of vision through said lenses and having portions visible to the respective eyes, said portions each comprising relatively pronounced peripheral fusible means and central fusible means arranged in groups of the same size lying within the peripheral stimuli with at least one group of said central fusible means for the respective eyes having associated therewith test symbols of graded sizes for detecting visual acuity deficiencies, the respective components of said fusible means being spaced apart an amount substantially equal to the distance between the lenses to tend to relax accommodation during the test, said test means being positioned a distance from said lenses substantially equal to the principal focal point of said lenses.

4. A test device comprising a pair of lenses before the eyes and eye fixation means positioned within the field of vision through said lenses and having portions visible to the respective eyes, said portions each comprising relatively pronounced peripheral fusible means arranged in groups, with each of said means in said groups being of the same size and central fusible means with at least one group of said central fusible means for the respective eyes having associated therewith test symbols of graded sizes for detecting visual acuity deficiencies, and having means associated therewith for detecting stereopsis.

5. A test device comprising means adapted to be viewed by each respective eye under conditions which tend to relax accommodation, said means each comprising relatively pronounced peripheral fusible stimuli so spaced relative to each other as to insure that the line of vision of the respective eyes remain substantially parallel during the test and further comprising central fusible means arranged in groups, with each of said means in said groups being of the same size and with at least one group of said means for the respective eyes having associated therewith test symbols of graded sizes for detecting visual acuity deficiencies and having means associated therewith for detecting stereopsis.

6. A test device comprising means adapted to be viewed by each respective eye under conditions which tend to relax accommodation, said means each comprising relatively pronounced peripheral fusible stimuli and areas divided by less pronounced peripheral stimuli with one of said areas for the respective eyes having a group of central fusible stimuli of the same size having associated therewith graded fusible test symbols for detecting binocular visual acuity deficiencies and another of said areas having central fusible means with at least one group of said means for one eye having associated therewith graded test symbols for detecting monocular visual acuity deficiencies.

7. A test device comprising means adapted to be viewed by each respective eye under conditions which tend to relax accommodation, said means each comprising relatively pronounced peripheral fusible stimuli and areas divided by less pronounced peripheral stimuli with one of said areas for the respective eyes having central fusible stimuli of the same size having associated therewith graded fusible test symbols for detecting binocular visual acuity deficiencies and another of said areas having central fusible means with at least one group of said means for one eye having associated therewith graded test symbols for detecting monocular visual acuity deficiencies and another of said areas having central fusible means with portions of a form character separately distinguishable by the respective eyes adapted to combine with each other under single binocular vision to produce a different distinguishable form character.

8. A test device comprising means adapted to be viewed by each respective eye under conditions which tend to relax accommodation, said means each comprising relatively pronounced peripheral fusible stimuli and areas divided by less pronounced peripheral stimuli with one of said areas for the respective eyes having central fusible stimuli of the same size having associated therewith graded fusible test symbols for detecting binocular visual acuity deficiencies and another of said areas having central fusible means with at least one group of said means for one eye having associated therewith graded test symbols for detecting monocular visual acuity deficiencies and another of said areas having central fusible means with portions of a form character separately distinguishable by the respective eyes adapted to combine with each other under single binocular vision to produce a different distinguishable form character and having additional means adjacent said central fusible means having fusible characteristics adapted to detect the presence of stereopsis.

JULIUS F. NEUMUELLER.